(12) United States Patent
Bonerz et al.

(10) Patent No.: US 9,089,942 B2
(45) Date of Patent: Jul. 28, 2015

(54) DEVICE FOR PROTECTING A WORK SPINDLE

(75) Inventors: Stefan Bonerz, Marktoberdorf (DE); Wolfgang Bechteler, Ebenhofen (DE); Josef Greif, Friesenried (DE)

(73) Assignee: OTT-JAKOB SPANNTECHNIK GMBH, Lengenwang (DE)

( * ) Notice: Subject to any disclaimer, the term of this patent is extended or adjusted under 35 U.S.C. 154(b) by 871 days.

(21) Appl. No.: 13/172,422

(22) Filed: Jun. 29, 2011

(65) Prior Publication Data
US 2012/0004760 A1    Jan. 5, 2012

(30) Foreign Application Priority Data
Jul. 2, 2010    (DE) .......................... 10 2010 025 900

(51) Int. Cl.
*B23Q 17/22*    (2006.01)
*G05B 19/4061*    (2006.01)

(52) U.S. Cl.
CPC ........ *B23Q 17/2208* (2013.01); *G05B 19/4061* (2013.01); *G05B 2219/37425* (2013.01); *G05B 2219/49141* (2013.01)

(58) Field of Classification Search
CPC ........... B23Q 17/2208; G05B 19/4061; G05B 2219/49141; G05B 2219/37425
USPC .................................................. 700/159, 178
See application file for complete search history.

(56) References Cited

U.S. PATENT DOCUMENTS

| 4,118,139 | A | * | 10/1978 | Lemelson ...................... 408/12 |
| 4,489,377 | A | | 12/1984 | Mawyer et al. |
| 7,043,333 | B2 | | 5/2006 | Schiavi et al. |

(Continued)

FOREIGN PATENT DOCUMENTS

| DE | 10351347 A1 | 7/2004 |
| DE | 602004000096 T2 | 7/2006 |

(Continued)

OTHER PUBLICATIONS

Chang et al., "In-process surface roughness prediction using displacement signals from spindle motion", 2006 Elsevier.*

(Continued)

*Primary Examiner* — Carlos Ortiz Rodriguez
(74) *Attorney, Agent, or Firm* — Fleit Gibbons Gutman Bongini & Bianco PL; Martin Fleit; Paul D. Bianco

(57) ABSTRACT

In a device for protecting a work spindle (2) that is rotatably supported in a spindle head (4A, 4B) of a processing machine and/or a tool (3) clamped in the work spindle (2) from collisions with obstacles in the processing chamber (1) of the processing machine, a plurality of distance sensor modules (6) are arranged on or in a spindle nose (4B) that forms the termination of the spindle head (4A, 4B) toward the processing chamber (1) such that they point toward the processing chamber (1) and are connected to a common signal processing unit (8). When an obstacle is present in a predetermined area of the processing chamber (1), this signal processing unit generates a warning signal based on the measuring signals delivered by the individual distance sensor modules (6). An output (15) of the signal processing unit, at which the warning signal is generated, is connected to the machine control (16) of the processing machine. The distance sensor modules (6) preferably consist of radar or ultrasonic sensor modules.

14 Claims, 2 Drawing Sheets

(56) References Cited

U.S. PATENT DOCUMENTS

| | | | |
|---|---|---|---|
| 2007/0181306 A1 | 8/2007 | Tupper et al. | |
| 2009/0018001 A1 | 1/2009 | Jakob | |

FOREIGN PATENT DOCUMENTS

| | | |
|---|---|---|
| DE | 102007032498 A1 | 1/2009 |
| DE | 102007053546 A1 | 3/2009 |
| EP | 0104409 A2 | 4/1984 |
| EP | 2402114 B1 | 10/2012 |
| JP | 62-152640 | 7/1987 |
| JP | 2000-210841 | 8/2000 |
| JP | 2006102923 A | 4/2006 |
| WO | 2008025577 A1 | 3/2008 |

OTHER PUBLICATIONS

European Search Report for European Application EP11170569 dated Sep. 30, 2011.

Soo Jeon et al, "New Design of Cylindrical Capacitie Sensor for On-Line Precision Control of AMB Spindle", IEEE Transaction on Instrumentation and Measurement, vol. 50, No. 3, Jun. 2001, pp. 757-763.

* cited by examiner

DEVICE FOR PROTECTING A WORK SPINDLE

CROSS REFERENCE TO RELATED APPLICATIONS

This application claims priority under 35 U.S.C. §119 to German Patent Application No. 10 2010 025 900.4 filed Jul. 2, 2010, the entire contents of which are incorporated herein by reference.

FIELD OF THE INVENTION

The invention pertains to a device for protecting a work spindle.

BACKGROUND OF THE INVENTION

When programming and setting up a machine tool, operating errors may result in the tool or the work spindle colliding with a work piece arranged in the processing chamber during its displacement in the x, y or z direction. This causes damages to bearings, deformations of shafts, crack formations or material fractures on tool, spindle or mounting components. These damages are associated with significant repair costs, particularly when optically invisible damages are overlooked and the further processing of the work piece is continued with a damaged system.

Mechanical safety measures have been proposed in order to solve this problem. For example, DE 10 2007 032 498 A1 proposes to support a work spindle in a spindle housing on a ring that is springably suspended, as well as axially displaceable and tiltable, relative to the spindle housing. This makes it possible to prevent the bearing of the work spindle from being overloaded in the axial and in the radial direction. However, spring elements can only develop a damping characteristic within a certain deflection range. This means that a severe collision can still occur when the work spindle is inadvertently displaced over greater distances.

A metrological approach is disclosed in DE the 103 51 347 A1. In this case, the tool clamping device of a work spindle is equipped with a pressure or force sensor that is primarily intended to measure the stress on the work spindle occurring during normal operation. An auxiliary function of such a sensor also makes it possible to detect an overload due to a collision with a work piece. In this case, the spindle motion can be stopped and inspection or repair measures can be initiated. However, it cannot be ensured that damages are reliably prevented due to the unavoidable latency in detecting the collision.

In order to prevent collisions of the type in question in the first place, it has also been proposed to carry out a computer-assistant comparison of the measured motion sequence of a work spindle with a previously stored model of the processing chamber. According to EP 0 104 409 A2, hazard zones are defined in the processing chamber, wherein the motion of the work spindle is stopped when these hazard zones are reached. However, computer-assisted monitoring devices have the disadvantage of requiring a high technical operating effort. 3D models from the construction need to be loaded into the machine control. Every motion of the machine simultaneously needs to be compared with this model. It is therefore only sensible to utilize such systems in more complex processing centers.

Another approach to preventing collisions is the optical monitoring of the processing chamber, e.g., as proposed in JP 2006-102923 A. In this case, the processing chamber is monitored with cameras, and the contours of objects present in the processing chamber are determined from the recorded images with pattern recognition algorithms. These contours are then compared with the intended motion path of the work spindle or a tool clamped therein in order to predict and prevent a possible collision by stopping the spindle motion in a timely fashion. Optical systems in combination with image analysis methods likewise require a high computational effort for carrying out the monitoring with real-time capability. Systems of this type quickly reach the limits of electronic processing capabilities during faster displacements. In addition, the image analysis is impaired by lubricant splashing and chips flying around the processing chamber.

SUMMARY OF THE INVENTION

In light of this state of the art, the invention aims to propose a new solution for protecting a work spindle from collisions with obstacles in the processing chamber, wherein this solution can be easily and cost-efficiently realized and makes it possible to anticipate and prevent collisions.

According to the invention, a plurality of distance sensor modules are arranged on a spindle nose that forms the termination of the spindle head toward the processing chamber such that they point toward the processing chamber and are connected to a common signal processing unit. If an obstacle is present in a predetermined area of the processing chamber, this signal processing unit generates a warning signal based on the measuring signals delivered by the individual distance sensor modules, wherein this warning signal is transmitted to the machine control of the processing machine via an output of the signal processing unit. Radar or ultrasonic sensor technologies, in particular, may be considered for this purpose, wherein complete modules of both sensor types are inexpensively available on the market.

All in all, a coherent, seamless monitoring area can be created around the work spindle and the tool due to a radially symmetrical arrangement of the distance sensor modules, i.e., an equidistant circular arrangement at a mutual distance that ensures an overlap of the detection areas, wherein it can be reliably detected when the work spindle or a tool clamped therein approaches an obstacle in the processing chamber during a motion of the spindle head, and wherein an impending collision can be avoided by changing the motion of the spindle head with the aid of the machine control.

The utilization of a plurality of distance sensor modules makes it possible to realize a multistatic radar or multistatic ultrasonic sonar system, in which the position of an obstacle is determined computationally by correlating the signals received from several distance sensors at a known location of one or more transmitters. In this way, the position of an obstacle can be determined with particularly high accuracy.

Since the intended motion sequence is known, the reaction of the machine control to the detection of an obstacle can be adapted in such a way that the motion of the spindle head is only stopped if it is on a collision course with the detected obstacle. In addition, the monitored area of the processing chamber can already be adapted to the moving direction of the spindle head such that the signal processing effort can be reduced and a shorter reaction time can be achieved.

Since the spindle nose forms part of the nonrotating spindle head, the inventive solution circumvents the problems associated with the installation of a sensor system on a rotating system component, wherein such an installation would be associated with a corresponding mechanical load on the sensor system, as well is the requirement to transmit data from a rotating to a nonrotating component. On the other hand, the position of the spindle nose relative to the work spindle is fixed such that the work spindle and the monitoring area of the sensor modules are always in a fixed spatial relationship due to the arrangement of the sensor modules on the spindle nose. This is a decisive advantage over sensor systems that are installed at a fixed location of the processing chamber and relative to which the spindle head with the work spindle and the tool can move, wherein these sensor systems, in contrast to the inventive device, also make it necessary to elaborately track the motion path by means of the signal processing unit.

BRIEF DESCRIPTION OF THE DRAWINGS

An exemplary embodiment of the invention is described below with reference to the drawings. In these drawings.

DETAILED DESCRIPTION OF THE INVENTION

Figure 1:
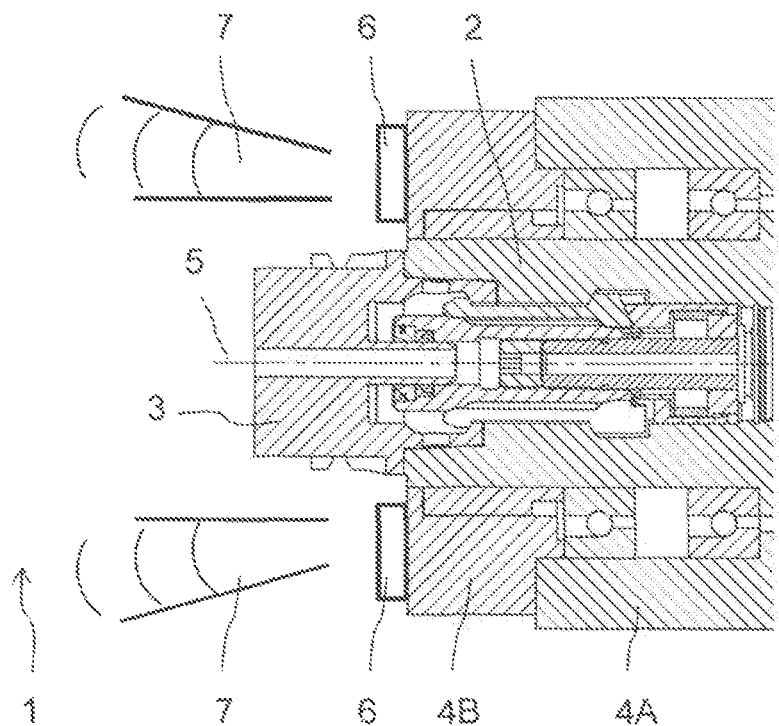
FIG. 1 shows a schematic longitudinal section through part of a processing machine equipped with an inventive device.

FIG. 1 shows the front end of a work spindle 2, i.e., the end that faces the processing chamber 1 of a processing machine and in which a tool 3 is clamped. The work spindle 2 is supported in a spindle head 4A, 4B by means of rolling bearings and rotates about its longitudinal axis 5 during the operation. An annular component, namely the so-called spindle nose 4B, forms the termination of the spindle head 4A, 4B relative to the processing chamber 1. The entire spindle head 4A, 4B can be displaced on a carriage at least in the direction of the longitudinal axis 5 of the work spindle 2 together with the work spindle 2. However, the spindle head 4A, 4B may also have other degrees of freedom for the motion transverse to the longitudinal axis 5 of the work spindle 2.

Several radar sensor modules 6 are arranged on the front side of the spindle nose 4B that faces the processing chamber, namely such that they are distributed over the circumference in a radially symmetrical fashion. The radiation lobes 7 of the radar sensor modules 6 are directed into the processing chamber 1, wherein each individual radar sensor module 6 only covers a section of the entire processing chamber 1. However, the radiation lobes 7 of radar sensor modules 6 that are arranged adjacent one another in the circumferential direction of the spindle nose 4B overlap in order to enable the entirety of all radar sensor modules 6 to form a seamless detection area that has the shape of a hollow cone and is coherent in said circumferential direction.

The shape of the radiation lobes 7 illustrated in FIG. 1, i.e., the aperture angle and the direction referred to the longitudinal axis 5 of the work spindle 2, should be interpreted in a purely exemplary fashion and can be adapted to the dimensions of the processing chamber 1 and to the shape of the tool 3 in individual applications. For example, the aperture angle could be larger or smaller than shown in FIG. 1. It could also be so small that the overall detection area formed by the individual overlapping radiation lobes 7 has the shape of a hollow cylinder rather than that of a hollow cone. In contrast to the illustration shown in FIG. 1, the radiation lobes 7 could, however, also widen in the direction of the longitudinal center axis 5 of the work spindle 2 such that the noncovered area around the longitudinal center axis 5 would not be cylindrical, but rather conical.

For example, systems in the range of 24 GHz or 66 GHz or ultra broadband systems may be used as radar sensor modules 6. Radar systems of this type are known as such in automotive engineering. Consequently, their function requires no detailed explanation.

Figure 2:
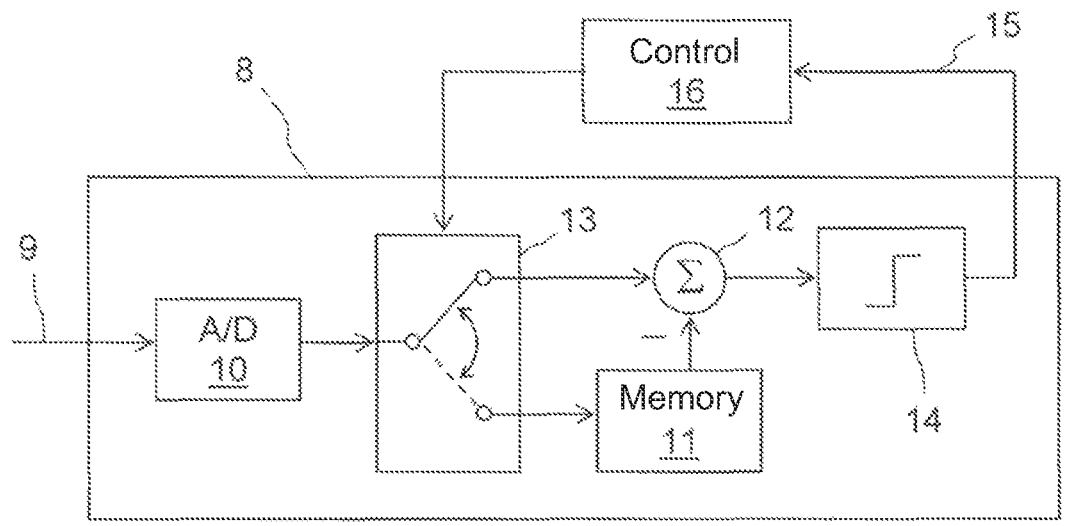
FIG. 2 shows a block diagram of an inventive signal processing unit.

A block diagram of an inventive signal processing unit 8 for processing the measuring signals delivered by the radar sensor modules 6 is illustrated in FIG. 2. Since the measuring signals are processed digitally, the input 9 of the signal processing unit 8 is initially connected to an analog/digital converter 10. In order to calibrate the system after the tool 3 is exchanged, i.e., to record and store the measuring signals of all radar sensor modules 6 in a defined axial position of the spindle head 4A, 4B, the signal processing unit 8 features a memory 11 and a signal path leading from the analog/digital converter 10 to the memory 11. During the normal operation, the digitized measuring signals of the radar sensor modules 6 are not routed to the memory 11, but rather to a subtracter 12. For this purpose, the signal processing unit 8 features a change-over switch 13 that makes it possible to selectively connect the analog/digital converter 10 to either the memory 11 or the subtracter 12.

The calibration after each tool exchange is necessary because a tool 3 acts as a reflector for radar signals and influences the reception signals of the radar sensor modules 6 at a given transmission signals, wherein the severity of this influence depends on the shape of the tool 3. However, the tool 3 does not represent an obstacle in the processing chamber 1 and it therefore must be possible to eliminate its influence from the measuring signals. This is achieved with the memory 11, the subtracter 12 and the change-over switch 13.

The reference data stored in the memory 11 contains the positions of all objects within the detection area of the radar sensor modules 6 in the processing chamber 1, namely also that of the tool 3. During the normal operation, this reference data is subtracted from the current measuring signals of the radar sensor modules 6 by the subtracter 12. Consequently, even a slight change in the processing chamber 1, i.e., the appearance of a small obstacle, can be detected with a high resolution. During the normal operation, such a change is detected by means of simple threshold value monitoring. This is the reason why a threshold value detector 14 is connected in series to the subtracter 12 in FIG. 2. If a deviation between the measuring signals of the radar sensor modules 6 and the calibration data stored in the memory 11 exceeds a predetermined threshold, this is an indicator for the presence of an obstacle in the processing chamber. In this case, a warning signal that indicates the risk of an impending collision between the tool 3, the work spindle 2 or the spindle nose 4B and an obstacle is generated at the output 15 of the signal processing unit 8, wherein the tool 3 is subject to the highest collision risk because it protrudes from the work spindle 2.

The output 15 of the signal processing unit 8 is connected to the machine control 16 of the processing machine. If a collision warning signal is received, this machine control stops the occurring motion of the spindle head 4A, 4B in order to avoid the impending collision if the motion takes place in the direction of the obstacle. Since the machine control knows the moving direction of the spindle head 4A, 4B, a motion only needs to be stopped when an obstacle is detected in the detection area of the radar sensor modules 6 if it is directed toward the obstacle. If an obstacle is detected in the detection area, but the spindle head 4A, 4B is currently retracted in the axial direction, i.e., moved away from the detected obstacle, the motion can be continued. Whenever an obstacle is detected, however, it is sensible to display a fault message on a display device of the machine control 18 in order to inform the operating personnel of the obstacle.

Figure 3:
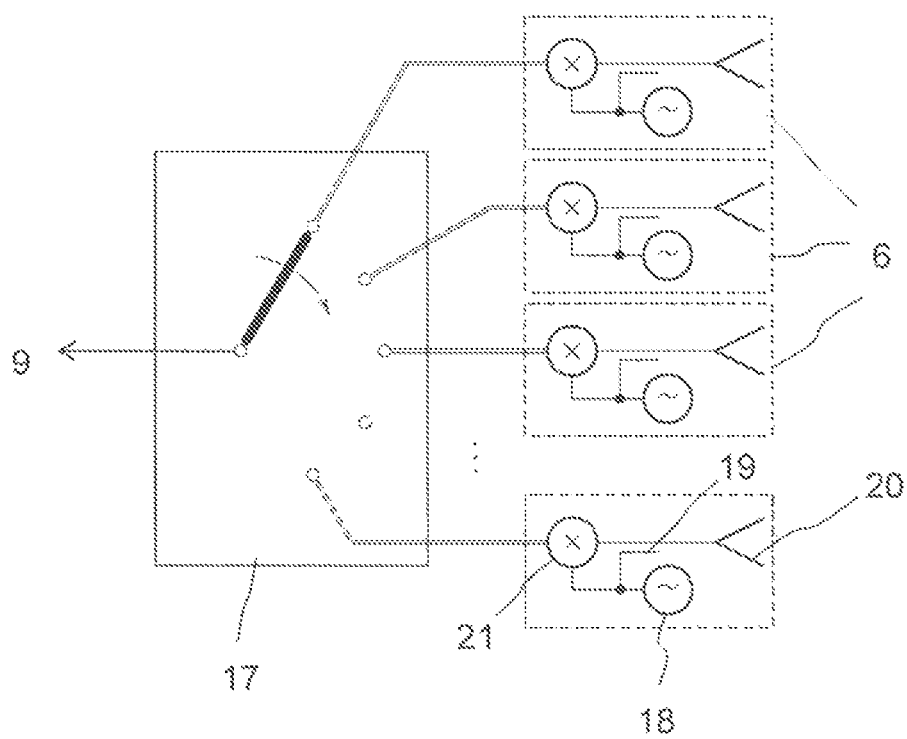
FIG. 3 shows a block diagram of an inventive sensor arrangement.

FIG. 3 shows block diagrams of the identical radar sensor modules 6, the outputs of which are connected to a multiplexer 17 and to the input 9 of the signal processing unit 8 via this multiplexer. It goes without saying that the signal processing unit 8 needs to be informed of the current switching position of the multiplexer 17 by means of corresponding control signals such that the current measuring signal can be assigned to the radar sensor module 6 that delivers this measuring signal and the corresponding area of the reference data memory 11 can be accessed.

Each individual radar sensor module 6 arranged on the front face of the spindle nose 5 contains an oscillator 18, a directional coupler 19, a combined transmitting and receiving antenna 20, as well as a demodulator 21. The latter also comprises a low-pass filter that is not illustrated in FIG. 3. The oscillator 18 transmits a periodic signal with fixed frequency to the antenna 20 via the directional coupler 19 and the antenna emits this signal into the processing chamber 1. This signal simultaneously is directly transmitted to the demodulator 21, the other input of which is connected to the antenna 20. The demodulator 21 therefore transforms the input signal received by the antenna 20 into the baseband. The generated baseband signal theoretically is zero if no signal is received by the antenna 20. If a reflecting object is situated in the radiation/reception area of the antenna 20, this leads to the reception of a reflection signal by the antenna 20 and consequently to a no longer disappearing baseband signal at the output of the demodulator 21.

The output signal of each individual radar sensor module 6 therefore contains information on the presence of a reflecting object in the radiation lobe 7 of its respective antenna 20. It is obvious that the appearance of an obstacle can be detected by continuously comparing this output signal with a reference signal that was stored during the calibration after a tool exchange while no obstacle was present in the processing chamber 1. As explained above with reference to FIG. 2, this comparison is realized by subtracting the reference signal from the current signal and a subsequent threshold value comparison. Depending on the switching position of the multiplexer 17, a certain segment of the reference data stored in the memory 11 that is assigned to the radar sensor module 6 currently being switched through by the multiplexer 17 is accessed.

When an obstacle is detected, information on its angular position within the processing chamber 1 referred to a cylindrical coordinate system, the longitudinal axis of which is the longitudinal axis 5 of the work spindle 2, can be obtained due to the assignment of the current measuring signal to a certain radar sensor module 6. This information is also transmitted to the machine control 16. If the spindle head 4A, 4B currently carries out a motion with a transverse component referred to the longitudinal axis 5, the risk of a collision with a detected obstacle also depends on its angular position in said cylindrical coordinate system. Consequently, such a motion only needs to be stopped by the machine control 16 in order to avoid a collision if it is directed toward the obstacle referred to its angular position.

In case of a motion with a transverse component referred to the longitudinal axis 5, it is furthermore possible to only utilize some of the radar sensor modules 6 for the obstacle detection in the first place, namely the radar sensor modules, the radiation lobes 7 of which are directed toward the area of the processing chamber that is vulnerable to a collision. During an upward motion of the spindle head 4A, 4B in FIG. 1, for example, the upper radar sensor module 6 would have to be used for the obstacle detection in any case while the lower radar sensor module can be disregarded because no collision with an obstacle can take place in its detection area in the processing chamber during an upward motion.

This means that the multiplexer 17 does not have to successively switch through all existing radar sensor modules 6 to the input 9 of the signal processing unit 8, but rather only those that contribute to the detection in the area of the processing chamber 1 that lies in the moving direction. For this purpose, the machine control 16 needs to deliver corresponding control signals to the multiplexer 17, as well as to the signal processing unit 8, wherein these control signals indicate the input channels of the multiplexer 17 to be switched through or their assignment to the corresponding areas of the memory 11 such that the signal processing sequence can be adapted accordingly. It goes without saying that this sequence is accelerated if it is merely required to process the signals of some radar sensor modules 6 rather than those of all radar sensor modules.

Another conceivable option is the operation of the radar sensor modules 6 in accordance with a multistatic radar. This means that one or more radar sensor modules 6 are operated as transmitters only and other radar sensor modules 6 are operated as reflection receivers only. The axial position and the angular position of a reflecting object, as well as its distance from the spindle nose 4B, can then be calculated from the known relative position between the transmitters and receivers. In this case, the position of an obstacle is not determined based on the position of one or more radar sensor modules 6 that respectively indicate the presence of the obstacle individually, but rather computationally by correlating the signals received from several radar sensor modules 6 at a known location of the transmitter.

The detection range can be adjusted in accordance with the respective requirements by varying the radiated power. For example, reflections from distant objects that lie outside the possible moving range of the spindle head 4A, 4B or the tool 3 clamped into the work spindle 2 and therefore basically do not represent a collision risk are not important. If the range is adjusted accordingly by varying the transmitting power, reflections of such distant and therefore harmless objects can be reduced to such a degree that they no longer interfere with the detection of obstacles in the area of the processing chamber 1 that is vulnerable to collisions.

Although a solution on the basis of radar, i.e., the emission and reflection of short-wave electromagnetic signals, was presented in the above-described exemplary embodiment, the invention can likewise be realized on the basis of ultrasound, i.e., the emission and reflection of short-wave acoustic signals. Ultrasonic sensors are widely used, for example, in the fields of medical diagnostics and automotive engineering and corresponding ultrasound-based sensor modules are available on the market similar to the radar-based sensor modules.

In the preceding description, it was furthermore assumed that the spindle head 4A, 4B can be displaced at least in the direction of the longitudinal center axis 5 of the work spindle 2. Alternatively, the spindle head 4A, 4B could also be stationarily arranged on the processing machine, in which case the carrier of the work piece to be processed can be displaced. The initially described collision risk also applies to the latter instance and the invention can be used for preventing potential collisions. In this case, the machine control 16 would control the motion of the work piece carrier and stop this motion when a collision risk is detected.

The outside arrangement of the radar sensor modules 6 on the front face of the spindle nose 4B shown in FIG. 1 should be interpreted in a purely exemplary fashion. For example, the modules 6 could also be accommodated in cavities of a suitable size that are formed on the front face of the spindle nose 4B or arranged on the outer circumference of the spindle nose 4B. It is merely important that they are arranged on the nonrotating spindle nose 4B and directed toward the processing chamber 1, i.e., that their respective detection area is directed into the processing chamber.

While various descriptions of the present invention are described above, it should be understood that the various features can be used singly or in any combination thereof. Therefore, this invention is not to be limited to only the embodiments depicted herein. Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention.

The invention claimed is:

1. A device for protecting a work spindle that is rotatably supported in a spindle head of a processing machine and/or a tool clamped in the work spindle from collisions with obstacles in a processing chamber of the processing machine, comprising:
   a plurality of distance sensor modules arranged on or in a spindle nose that forms a termination of the spindle head toward the processing chamber such that the plurality of distance sensor modules point toward the processing chamber with a detection area of each of the plurality of distance sensors modules directed into the processing chamber, the plurality of distance sensor modules connected to a common signal processing unit;
   the common signal processing unit generates a warning signal based on measuring signals delivered by individual distance sensor modules of the plurality of distance sensor modules if an obstacle is present in a predetermined area of the processing chamber;
   an output of the common signal processing unit, at which the warning signal is generated, is connected to a machine control of the processing machine, which is changing a motion of the spindle head or work piece carrier in order to avoid an impending collision when receiving the warning signal; and
   the plurality of distance sensor modules are arranged radially symmetrical at such a distance from one another that sensed areas of each sensor overlap to form a coherent overall detection area.

2. The device according to claim 1, wherein the coherent detection area at least approximately has the shape of a hollow cylinder or a hollow cone.

3. The device according to claim 1, wherein the distance sensor modules consist of radar or ultrasonic sensor modules.

4. The device according to claim 1, wherein the common signal processing unit features a memory, in which reference signals of the distance sensor modules are stored that were recorded without the presence of an obstacle in the processing chamber, and the common signal processing unit features a comparator that compares the measuring signals recorded by the plurality of distance sensor modules with the reference signals stored in the memory and generates the warning signal if a predetermined minimum deviation is detected.

5. The device according to claim 4, wherein the comparator comprises a subtracter that is connected to the memory and a threshold value detector that is connected in series to the subtracter.

6. The device according to claim 1, wherein the warning signal contains information on an angular position of a detected obstacle with respect to a cylindrical coordinate system, a longitudinal axis of which is a longitudinal center axis of the work spindle, wherein this information is obtained from the angular positions of the individual distance sensor modules referred to said coordinate system.

7. The device according to claim 1, further including a multistatic radar or multistatic ultrasonic sonar, in which the position of an obstacle is determined computationally by correlating the measuring signals received from the plurality of distance sensor modules at a known location of one or more transmitters.

8. A method for operating a device according to claim 1, wherein the signals of the distance sensor modules are initially recorded without the presence of an obstacle in the processing chamber and stored in a memory in the form of reference signals after an exchange of a tool clamped in the work spindle and prior to a motion of the spindle head.

9. The method according to claim 8, wherein the signals of the distance sensor modules are continuously recorded after storing the reference signals and monitored with respect to a predetermined minimum deviation from the reference signals, and a warning signal indicating the presence of an obstacle in the processing chamber is generated when such a deviation is detected and delivered to the machine control of the processing machine.

10. The method according to claim 9, wherein the monitoring is realized by subtracting the reference signals from signals of the distance sensor modules and comparing the difference with a predetermined threshold value.

11. The method according to claim 9, wherein the machine control of the processing machine stops a motion of the spindle head if the machine control receives the warning signal.

12. The method according to claim 11, wherein the warning signal contains information on the position of the obstacle within the processing chamber, and the motion of the spindle head is only interrupted if motion of the spindle head takes place in a direction of the position of the obstacle indicated by the warning signal.

13. The method according to claim 9, wherein information on a moving direction is transmitted to the signal processing unit by the machine control during a motion of the spindle head, and the signal processing unit only processes the signals of the distance sensor modules, having sensed areas which lie in the moving direction of the spindle head, while the signal processing unit monitors the signals of the distance sensor modules with respect to a predetermined minimum deviation from the reference signals.

14. A device for protecting a work spindle that is rotatably supported in a spindle head of a processing machine and/or a tool clamped in the work spindle from collisions with obstacles in a processing chamber of the processing machine, comprising:
   a plurality of distance sensor modules arranged on or in a spindle nose that forms a termination of the spindle head toward the processing chamber such that the plurality of distance sensor modules point toward the processing chamber and are connected to a common signal processing unit, a respective detection area of each of the plurality of distance sensor modules directed into the processing chamber;
   the common signal processing unit generates a warning signal based on measuring signals delivered by individual distance sensor modules of the plurality of distance sensor modules if an obstacle is present in a predetermined area of the processing chamber; and
   an output of the common signal processing unit, at which the warning signal is generated, is connected to a machine control of the processing machine, which is changing a motion of the spindle head or work piece carrier in order to avoid an impending collision when receiving the warning signal.

* * * * *